(12) United States Patent
Forloni

(10) Patent No.: US 6,602,455 B1
(45) Date of Patent: Aug. 5, 2003

(54) HIGHLY BI-AXIALLY ORIENTED, HEAT-SHRINKABLE, THERMOPLASTIC, MULTI-LAYER FILM AND PROCESS FOR THE MANUFACTURE THEREOF

(75) Inventor: Roberto Forloni, Garbatola di Nerviano (IT)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/856,878
(22) PCT Filed: Dec. 13, 1999
(86) PCT No.: PCT/EP99/09853
§ 371 (c)(1), (2), (4) Date: Aug. 16, 2001
(87) PCT Pub. No.: WO00/37253
PCT Pub. Date: Jun. 29, 2000

(30) Foreign Application Priority Data

Dec. 18, 1998 (EP) ............................................. 98124110

(51) Int. Cl.⁷ .................... B32B 31/30; B32B 27/30; B32B 27/32
(52) U.S. Cl. ............... 264/173.15; 264/173.12; 264/173.14; 264/173.19; 264/210.1; 264/210.2; 264/211.12; 428/516; 428/520; 428/910
(58) Field of Search ............ 264/173.12, 173.14, 264/173.15, 173.19, 210.1, 210.2, 211.12; 428/516, 520, 910

(56) References Cited

U.S. PATENT DOCUMENTS

| | | | |
|---|---|---|---|
| 5,382,470 A | 1/1995 | Vicik | 428/334 |
| 5,910,374 A | 6/1999 | Shah | 428/474.4 |

FOREIGN PATENT DOCUMENTS

WO    WO 95/13187    5/1995

Primary Examiner—D. S. Nakarani
(74) Attorney, Agent, or Firm—Mark B. Quatt

(57) ABSTRACT

A bi-axially oriented, heat-shrinkable multi-layer film comprising a core layer (A) comprising an ethylene-vinyl alcohol copolymer (EVOH), a first outer layer (B) comprising an ethylene homo- or co-polymer and a second outer layer (C), which may be equal to or different from the first outer layer (B), comprising an ethylene homo- or co-polymer, characterized in that said film has been bi-axially oriented at an orientation ratio in the longitudinal direction higher than 4:1, preferably higher than 4.5:1, more preferably of at least 5:1 and at an orientation ratio in the cross-wise direction higher than 4:1, preferably higher than 4.5:1, more preferably of at least 5:1, is obtained by a process which comprises melt extrusion of the film polymers through a flat die and orientation of the obtained cast sheet simultaneously in the longitudinal and the transversal directions by a simultaneous tenter.

11 Claims, 1 Drawing Sheet

HIGHLY BI-AXIALLY ORIENTED, HEAT-SHRINKABLE, THERMOPLASTIC, MULTI-LAYER FILM AND PROCESS FOR THE MANUFACTURE THEREOF

The present application is a 35 USC §371 application of PCT/EP99/09853 filed Dec. 13, 1999, which claims the benefit of EP Patent Application No. 98124110.2 filed Dec. 18, 1998.

FIELD OF THE INVENTION

The present invention refers highly bi-axially oriented, heat-shrinkable, thermoplastic, multi-layer film and to the process for the manufacture thereof.

More particularly the present invention refers to a heat-shrinkable, thermoplastic, multi-layer film comprising a core layer (A) comprising an ethylene-vinyl alcohol copolymer (EVOH), a first outer layer (B) comprising an ethylene homo- or co-polymer and a second outer layer (C), which may be equal to or different from the first outer layer (B), comprising an ethylene homo- or co-polymer, characterized in that said film has been bi-axially oriented at an orientation ratio in the longitudinal direction higher than 4:1, preferably higher than 4.5:1, even more preferably of at least 5:1, and at an orientation ratio in the cross-wise direction higher than 4:1, preferably higher than 4.5:1, even more preferably of at least 5:1.

BACKGROUND OF THE INVENTION

Bi-axially oriented, heat-shrinkable, thermoplastic, multi-layer films are films that have been oriented by stretching in two perpendicular directions, typically the longitudinal or machine direction (MD) and the transverse or crosswise direction (TD), at a temperature higher than the highest Tg of the resins making up the film layers and lower than the highest melting point of at least one polymer of the film layers, i.e. at a temperature where the resins, or at least some of the resins, are not in the molten state.

Bi-axially oriented, heat-shrinkable, thermoplastic films are made by extruding polymers from a melt into a thick sheet that is quickly quenched to prevent or delay polymer crystallization, and then oriented by stretching under temperature conditions, as indicated above, where molecular orientation of the film occurs and the film does not tear. Upon subsequent re-heating at a temperature close to the orientation temperature, the oriented, heat-shrinkable, film will tend to shrink in seeking to recover its original dimensional state. In fact, when the film, where the polymer molecules are aligned in the direction of the drawing force and locked into this configuration by cooling, is heated to a temperature close to the orientation one, mobility is restored in the polymer molecules and they relax back to the coil configuration, physically manifesting said relaxation with a shrink along the direction of the orientation.

Orientation brings out the maximum strength and stiffness inherent in the polymer system, thus increasing the tensile properties of the film.

Orientation also induces higher level of crystallinity so that properties like gas barrier properties are further enhanced in an oriented film.

In general orientation leads to a crystalline structure that scatters much less light than the crystalline domains formed in unoriented films and therefore orientation leads to generally superior optical properties.

Oriented, heat-shrinkable films are therefore widely appreciated and widely used in packaging, particularly in food packaging. In general terms the packaging of food and non-food items by means of an oriented, heat-shrinkable, thermoplastic film comprises configuring the heat-shrinkable packaging material, either partially or completely, around a product, removing excess air if necessary, sealing it to itself or to the rims of a support containing the product to be packaged or otherwise let the two edges of the packaging material to overlap and adhere to each other without heat-sealing them and thereafter exposing the package to a heat source thereby causing the heat-shrinkable film to shrink and conform with the contours of the packaged item or become tight between the rims to which it has been sealed.

Heat-shrinkable films are used to both provide the package with an aesthethically appealing appearance and guarantee that the packaged product is protected from the environment.

Bi-axially oriented, heat-shrinkable multi-layer films comprising a core layer (A) comprising an ethylene-vinyl alcohol copolymer, a first outer layer (B) comprising an ethylene homo- or copolymer and a second outer layer (C) comprising an ethylene homo- or co-polymer, are known.

As an example; EP-A-141,555 discloses an oriented five layered film with a core layer of a blend of an ethylene-vinyl alcohol copolymer and a polyamide, two outer layers of a blend of ethylene-vinyl acetate and low density linear polyethylene, and two tie layers on the two surfaces of the core layer, adhering said surfaces of the core layer to a respective outer layer. EP-A-141,555 describes, as the most practical manner of extruding and orienting the film, the "double-bubble" technique, according to which the film is extruded downwardly as a tube formed by an annular die, quenched by a water cascade and a water bath, re-heated to the suitably selected orientation temperature, and then oriented by stretching. Stretching in the machine direction is carried out by two sets of rolls that are rotated in such a way so as to establish a linear rate differential therebetween, while the simultaneous orientation in the cross-wise or transversal direction is carried out by inflating the bubble trapped between the to nips of the rolls. Convenient orientation ratios there described are comprised between 2:1 and 4:1 in both directions.

EP-A-217,596 describes an oriented, heat-shrinkable cross-linked film having a core layer comprising an ethylene-vinyl alcohol copolymer, two outer layers comprising a blend of ethylene-vinyl acetate, low density linear polyethylene and medium density linear polyethylene, and two tie layers adhering the surfaces of the core layer to a respective outer layer. The process there described involves extrusion of a thick sheet in the form of a tube, cooling thereof, cross-linking by irradiation, re-heating to the suitably selected orientation temperature and orientation in a way similar to that described in EP-A-141,555. The orientation ratios described in the examples of EP-A-217,596 are about 3.5:1 in each direction.

WO-A-95/13,187 describes an alternative process for the manufacture of bi-axially oriented, heat-shrinkable multi-layer films, including those described in the above patents, having at least one layer comprising an ethylene-a-olefin copolymer and showing more than one melting point in DSC. Said process provides for the extrusion of the polymers through a flat die in the form of a sheet, and after a quenching step and an optional irradiation step, for the heating of the flat sheet to the orientation temperature and the stretching thereof first longitudinally, by running the sheet over at least two series of pull rolls wherein the second set runs at a higher speed than the first one, and then transversally, by grasping the edges of the sheet by clips carried by two continuous chains running on two tracks that move wider apart as they go along.

The films obtained by this latter method distinguish from those obtainable by the trapped bubble technique in the thickness variation, that is always lower than 10% and in the planarity, that is significantly more controlled.

While, in line of principle, higher stretching ratios could be employed using flat extrusion and flat orientation with respect to those obtainable with the trapped-bubble technique, an MD stretching ratio of 2.4 to 1 and a TD stretching ratio of 4.5 to 1 are reported in Example 26 of WO-A-95/13,187 for the manufacture of a film comprising a core layer of a blend of ethylene-vinyl alcohol and 20% by weight of a polyamide 6/12.

Ethylene-vinyl alcohol is in fact a highly crystalline polymer known to be difficult to orient. Particularly in the sequential stretching described in WO-A-95/13,187, the first orientation step induces some polymer crystallization that increases the resistance of the film to further stretching. Ethylene-vinyl alcohol is therefore typically admixed with a polyamide or other plasticizers in the orientation processes.

The use of high stretching temperatures, particularly for the transverse stretching, would help to increase the stretching ratios. As a matter of fact orientation of films with a core layer of ethylene-vinyl alcohol and outer layers of polypropylene or propylene-ethylene co-polymers at high stretching ratios on a sequential tenter frame line using fairly high orientation temperatures is described in the prior art (EP-A-311,293). Such high orientation temperatures however would not be compatible with the presence of an ethylene homo- or co-polymer in the outer layers. Furthermore the use of high orientation temperatures would impair the shrink and mechanical properties of the end film as the higher the orientation temperature the less oriented the end film. As a matter of fact so-called heat-set films (i.e. films heat-stable that would not shrink when heated close to the temperature of orientation) are typically obtained.

Simultaneous stretching of a continuous traveling flat sheet in the longitudinal and transversal directions is a technique known in the literature since many years. U.S. Pat. No. 2,923,966, issued in 1960, described an apparatus for carrying out such a simultaneous flat stretching. The apparatus there claimed comprised two endless conveyors, positioned on the two sides of the web and disposed along divergent paths, said conveyors being formed of a plurality of links pivotally interconnected at their ends to provide a lazy-tongue structure and carrying a series of spaced clips to grip the web edges.

The use of endless loop linear motor systems for the simultaneous stretching of a continuous traveling flat sheet has later been described, e.g. in U.S. Pat. No. 3,890,421, and improvements thereto, with particular reference to the problem of controlling synchronism, have been described in e.g. U.S. Pat. No. 4,825,111, U.S. Pat. No. 4,853,602; and U.S. Pat. No. 5,051,225.

Actually there are various commercial simultaneous bi-axial film tenters.

These are however employed for the manufacture of heat-stable, generally monolayer films, particularly bi-axially oriented polyethylene terephthalate (BO-PET) and bi-axially oriented polyamide (BO-PA).

None of these apparatuses has been employed or tested for the manufacture of heat-shrinkable multi-layer films.

SUMMARY OF THE INVENTION

It has now been found that it is possible to obtain a highly bi-axially oriented, heat-shrinkable film comprising a core layer (A) comprising an ethylene-vinyl alcohol copolymer, a first outer layer (B) comprising an ethylene homo- or co-polymer and a second outer layer (C), which may be equal to or different from the first outer layer (B), comprising an ethylene homo- or co-polymer, by carrying out the stretching step simultaneously in both directions by means of a simultaneous tenter frame and using orientation ratios higher than 4:1, preferably higher than 4.5:1, more preferably of at least 5:1, in both the longitudinal direction and the cross-wise direction.

The film thus obtained not only has a thickness variation less than 10% and a very good planarity but also high and fairly balanced shrink properties.

In the packaging of a relatively rigid product which is not distorted by forces produced by a shrinking film, it is generally desirable to provide a heat-shrinkable packaging film with as high a free shrink as possible, in order to provide the "tightest" possible packaging over the product and/or to provide the desired shrink at a lower temperature. The highly oriented EVOH-comprising films obtained according to the present invention have a high free shrink, thereby enabling improved product appearance over a film having a lower free shrink.

A first object of the present invention is therefore a bi-axially oriented, heat-shrinkable, thermoplastic, multi-layer film comprising a core layer (A) comprising an ethylene-vinyl alcohol copolymer (EVOH), a first outer layer (B) comprising an ethylene homo- or co-polymer and a second outer layer (C), which may be equal to or different from the first outer layer (B), comprising an ethylene homo- or co-polymer, characterized in that said film has been bi-axially oriented at an orientation ratio in the longitudinal direction higher than 4:1, preferably higher than 4.5:1, more preferably of at least 5:1 and at an orientation ratio in the cross-wise direction higher than 4:1, preferably higher than 4.5:1, a more preferably of at least 5:1.

A second object of the present invention is a process for manufacturing a highly bi-axially oriented, heat-shrinkable, thermoplastic, multi-layer film comprising a core layer (A) comprising an ethylene-vinyl alcohol copolymer (EVOH), a first outer layer (B) comprising an ethylene homo- or co-polymer and a second outer layer (C), which may be equal to or different from the first outer layer (ES), comprising an ethylene homo- or co-polymer, which process comprises extrusion of the film resins through a flat die and bi-axial orientation of the obtained cast sheet simultaneously in the two perpendicular directions at an orientation ratio in the longitudinal direction higher than 4:1, preferably higher than 4.5:1, more preferably of at least 5:1 and at an orientation ratio in the cross-wise direction higher than 4:1, preferably higher than 4.5:1, more preferably of at least 5:1.

A third object of the present invention is the use of a bi-axially oriented, heat-shrinkable multi-layer film comprising a core layer (A) comprising an ethylene-vinyl alcohol copolymer (EVOH), a first outer layer (B) comprising an ethylene homo- or co-polymer and a second outer layer (C), which may be equal to or different from the first outer layer (B), comprising an ethylene homo- or co-polymer, wherein said film has been bi-axially oriented at an orientation ratio in the longitudinal direction higher than 4:1, preferably higher than 4.5:1, more preferably of at least 5:1 and at an orientation ratio in the cross-wise direction higher than 4:1, preferably higher than 4.5:1, more preferably of at least 5:1, in the packaging of food or non-food products.

DEFINITIONS

As used herein, the term "film" is used in a generic sense to include plastic web, regardless of whether it is film or sheet. Typically, films of and used in the present invention have a thickness of 150 μm or less, preferably they have a thickness of 100 μm or less, more preferably a thickness of 75 μm or less, still more preferably a thickness of 50 μm or less, and yet, still more preferably, a thickness of 30 μm or less.

As used herein, the phrases "inner layer" and "internal layer" refer to any layer having both of its principal surfaces directly adhered to another layer of the film.

As used herein, the phrase "outer layer" refers to any layer of film having only one of its principal surfaces directly adhered to another layer of the film.

As used herein, the phrase "inside layer" refers to the film outer layer that is closest to the product, relative to the other layers of the multi-layer film.

As used herein, the phrase "outside layer" refers to the film outer layer, of a multi-layer film packaging a product, which is furthest from the product relative to the other layers of the multi-layer film.

As used herein, the phrases "seal layer", "sealing layer", "heat seal layer", and "sealant layer", refer to an outer layer involved in the sealing of the film to itself, to another layer of the same or another film, and/or to another article which is not a film. With respect to packages having only fin-type seals, as opposed to lap-type seals, the phrase "sealant layer" generally refers to the inside layer of a package.

As used herein, the term "core", and the phrase "core layer", refer to any internal layer which preferably has a function other than serving as an adhesive or compatibilizer for adhering two layers to one another.

As used herein, the phrase "tie layer" refers to any internal layer having the primary purpose of adhering two layers to one another. Preferred polymers for use in tie layers include, but are not restricted to ethylene-unsaturated acid copolymer, ethylene-unsaturated ester copolymer, anhydride-grafted polyolefin and mixtures thereof.

As used herein, the phrase "thickness variation" refers to the percent value obtained by measuring the maximum and minimum thickness of the film, calculating the average thickness value and applying these numbers to the following $$\text{Thickness variation (\%)} = \frac{\text{film thickness}_{(max)} - \text{film thickness}_{(min)}}{\text{film thickness}_{(avg)}} \times 100.$$

The maximum and minimum thicknesses are determined by taking a total of 10 thickness measurements at regular distance intervals along the entirety of the transverse direction of a film sample, recording the highest and lowest thickness values as the maximum and minimum thickness values, respectively, while the average value is determined by summing up the same 10 thickness measurements and dividing the result by ten. The thickness variation is then computed (as a percent value) using the formula above. A thickness variation of 0% represents a film with no measurable differences in thickness. A thickness variation over 20% is unacceptable industrially while a thickness variation below 10% is a good value.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrases "orientation ratio" and "stretching ratio" refer to the multiplication product of the extent to which the plastic film material is expanded in the two directions perpendicular to one another, i.e. the machine direction and the transverse direction.

As used herein, the phrases "heat-shrinkable," "heat-shrink," and the like, refer to the tendency of the film to shrink upon the application of heat, i.e., to contract upon being heated, such that the size of the film decreases while the film is in an unrestrained state. As used herein said term refer to films with a total free shrink (i.e., free shrink in the machine direction plus free shrink in the transverse direction), as measured by ASTM D 2732, of at least 30 percent at 120° C., more preferably at least 40 percent, still more preferably, at least 50 percent, and, yet still more preferably, at least 60 percent.

As used herein, the term "monomer" refers to a relatively simple compound, usually containing carbon and of low molecular weight, which can react to form a polymer by combining with itself or with other similar molecules or compounds.

As used herein, the term "co-monomer" refers to a monomer that is co-polymerized with at least one different monomer in a co-polymerization reaction, the result of which is a copolymer.

As used herein, the term "polymer" refers to the product of a polymerization reaction, and is inclusive of homo-polymers, and co-polymers.

As used herein, the term "homo-polymer" is used with reference to a polymer resulting from the polymerization of a single monomer, i.e., a polymer consisting essentially of a single type of mer, i.e., repeating unit.

As used herein, the term "co-polymer" refers to polymers formed by the polymerization reaction of at least two different monomers. For example, the term "co-polymer" includes the co-polymerization reaction product of ethylene and an α-olefin, such as 1-hexene. However, the term "co-polymer" is also inclusive of, for example, the co-polymerization of a mixture of ethylene, propylene, 1-hexene, and 1-octene. The term "co-polymer" is also inclusive of random co-polymers, block co-polymers, and graft co-polymers.

As used herein, terminology employing a "-" with respect to the chemical identity of a copolymer (e.g., "an ethylene-α-olefin copolymer"), identifies the co-monomers which are co-polymerized to produce the copolymer.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER™ linear homogeneous ethylene-α-olefin copolymers produced by Mitsui, using Ziegler-Natta catalysts), heterogeneous polymers typically contain a relatively wide variety of chain lengths and co-monomer percentages.

As used herein, the phrase "homogeneous polymer" refers to polymerization reaction products of relatively narrow molecular weight distribution and relatively narrow composition distribution. Homogeneous polymers are structurally different from heterogeneous polymers, in that homogeneous polymers exhibit a relatively even sequencing of co-monomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler Natta catalysts.

More particularly, homogeneous ethylene-α-olefin copolymers may be characterized by one or more methods known to those of skill in the art, such as molecular weight distribution ($M_w/M_n$) composition distribution breadth index (CDBI), and narrow melting point range and single melt point behavior. The molecular weight distribution ($M_w/M_n$), also known as polydispersity, may be determined by gel permeation chromatography. The homogeneous ethylene-α-olefin copolymers useful in this invention generally have ($M_w/M_n$) of less than 2.7; preferably from about 1.9 to about 2.5; more preferably, from about 1.9 to about 2.3. The composition distribution breadth index (CDBI) of such homogeneous ethylene-α-olefin copolymers will generally be greater than about 70 percent. The CDBI is defined as the weight percent of the copolymer molecules having a co-monomer content within 50 percent (i.e., plus or minus 50%) of the median total molar co-monomer content. The CDBI of linear polyethylene, which does not contain a co-monomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene-α-olefin co-polymers have a CDBI greater than about 70%, i.e., a CDBI of from about 70% to about 99%. In general, the homogeneous ethylene-α-olefin co-polymers in the multi-layer films of the present invention also exhibit a relatively narrow melting point range, in comparison with "heterogeneous copolymers", i.e., polymers having a CDBI of less than 55%. Preferably, the homogeneous ethylene-α-olefin copolymers exhibit an essentially singular melting point characteristic, with a peak melting point ($T_m$), as determined by Differential Scanning Calorimetry (DSC), of from about 60° C. to about 110° C. Preferably the homogeneous copolymer has a DSC peak $T_m$ of from about 80° C. to about 105° C. As used herein, the phrase "essentially single melting point" means that at least about 80%, by weight, of the material corresponds to a single $T_m$ peak at a temperature within the range of from about 60° C. to about 110° C., and essentially no substantial fraction of the material has a peak melting point in excess of about 115° C., as determined by DSC analysis. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene-α-olefin copolymer can, in general, be prepared by the co-polymerization of ethylene and any one or more α-olefins. Preferably, the α-olefin is a $C_4$–$C_2$ α-mono-olefin, still more preferably, a $C_4$–$C_8$ α-mono-olefin. Still more preferably, the α-olefin comprises at least one member selected from the group consisting of butene-1, hexene-1, and octene-1, i.e., 1-butene, 1-hexene, and 1-octene, respectively. Most preferably, the α-olefin comprises octene-1, and/or a blend of hexene-1 and butene-1.

Processes for preparing and using homogeneous polymers are disclosed in U.S. Pat. No. 5,266,075, U.S. Pat. No. 5,241,031, and PCT International Application WO 93/03093, each of which is hereby incorporated by reference thereto, in its entirety. Further details regarding the production and use of homogeneous ethylene-α-olefin copolymers are disclosed in WO-A-90/03414, and WO-A-93/03093.

Still another genus of homogeneous ethylene-α-olefin copolymers is disclosed in U.S. Pat. No. 5,272,236, to Lai, et. al., and U.S. Pat. No. 5,278,272, to Lai, et. al.

As used herein, the term "polyolefin" refers to any polymerized olefin, which can be linear, branched, cyclic, aliphatic, aromatic, substituted, or unsubstituted. More specifically, included in the term polyolefin are homo-polymers of olefin, co-polymers of olefin, co-polymers of an olefin and an non-olefinic co-monomer co-polymerizable with the olefin, such as vinyl monomers, modified polymers thereof, and the like. Specific examples include polyethylene homo-polymer, polypropylene homo-polymer, polybutene homo-polymer, ethylene-α-olefin co-polymer, propylene-α-olefin co-polymer, butene-α-olefin co-polymer, ethylene-unsaturated ester co-polymer, ethylene-unsaturated acid co-polymer, (e.g. ethyl acrylate co-polymer, ethylene-butyl acrylate co-polymer, ethylene-methyl acrylate co-polymer, ethylene-acrylic acid co-polymer, and ethylene-methacrylic acid co-polymer), ionomer resin, polymethylpentene, etc.

As used herein the term "modified polyolefin" is inclusive of modified polymer prepared by co-polymerizing the homo-polymer of the olefin or co-polymer thereof with an unsaturated carboxylic acid, e.g., maleic acid, fumaric acid or the like, or a derivative thereof such as the anhydride, ester or metal salt or the like. It is also inclusive of modified polymers obtained by incorporating into the olefin homo-polymer or co-polymer, by blending or preferably by grafting, an unsaturated carboxylic acid, e.g., maleic acid, fumaric acid or the like, or a derivative thereof such as the anhydride, ester or metal salt or the like.

As used herein, the phrase "ethylene-α-olefin copolymer" refer to such heterogeneous materials as linear low density polyethylene (LLDPE), linear medium density polyethylene (LMDPE) and very low and ultra low density polyethylene (VLDPE and ULDPE); and homogeneous polymers such as metallocene-catalyzed EXACT™ linear homogeneous ethylene-α-olefin copolymer resins obtainable from Exxon, single-site AFFFNITY™ linear homogeneous ethylene-α-olefin copolymer resins obtainable from Dow, and TAF-MER™ linear homogeneous ethylene-α-olefin copolymer resins obtainable from Mitsui. All these materials generally include co-polymers of ethylene with one or more co-monomers selected from $C_4$ to $C_{10}$ α-olefin such as butene-1, hexene-1, octene-1, etc. in which the molecules of the copolymers comprise long chains with relatively few side chain branches or cross-linked structures. The heterogeneous ethylene-α-olefin co-polymer commonly known as LLDPE has a density usually in the range of from about 0.915 g/cm³ to about 0.930 g/cm³, that commonly known as LMDPE has a density usually in the range of from about 0.930 g/cm³ to about 0.945 g/cm³, while those commonly identified as VLDPE or ULDPE have a density lower than about 0.915 g/cm³.

As used herein, the term "adhered" is inclusive of films which are directly adhered to one another using a heat-seal or other means, as well as films which are adhered to one another using an adhesive which is between the two films. As used herein, the phrase "directly adhered", as applied to layers, is defined as adhesion of the subject layer to the object layer, without a tie layer, adhesive, or other layer therebetween. In contrast, as used herein, the word "between", as applied to a layer expressed as being between two other specified layers, includes both direct adherence of the subject layer between to the two other layers it is between, as well as a lack of direct adherence to either or both of the two other layers the subject layer is between, i.e., one or more additional layers can be imposed between the subject layer and one or more of the layers the subject layer is between.

As used herein, the phrase "free shrink" refers to the percent dimensional change in a 10 cm×10 cm specimen of film, when subjected to selected heat (i.e., at a certain temperature), with the quantitative determination being carried out according to ASTM D 2732, as set forth in the 1990 *Annual Book of ASTM Standards*, Vol. 08.02, pp.368–371. "Total free shrink" is determined by summing the percent free shrink in the machine direction with the percentage of free shrink in the transverse direction.

As used herein, "EVOH" refers to ethylene/vinyl alcohol copolymer. EVOH includes saponified or hydrolyzed ethylene/vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50%. and more preferably, at least $^{85}$%. Preferably, the EVOH comprises from about 28 to about 48 mole % ethylene, more preferably, from about 32 to about 44 mole % ethylene, and even more preferably, from about 38 to about 44 mole % ethylene.

As used herein, the term "polyamide" refers to both polyamide homo-polymers and polyamide co-polymers, also called co-polyamides.

As used herein the term "co-polyamide" on the other hand identifies the polyamide an product built from at least two different starting materials, i.e. lactams, aminocarboxylic acids, equimolar amounts of diamines and dicarboxylic acids, in any proportion; this term therefore also encompasses ter-polyamides and, in general, multi-polyamides.

BRIEF DESCRIPTION OF THE DRAWINGS

A detailed description of preferred embodiments of the invention follows, with reference to the sole attached drawing, wherein.

DETAILED DESCRIPTION OF THE INVENTION

Figure 1:
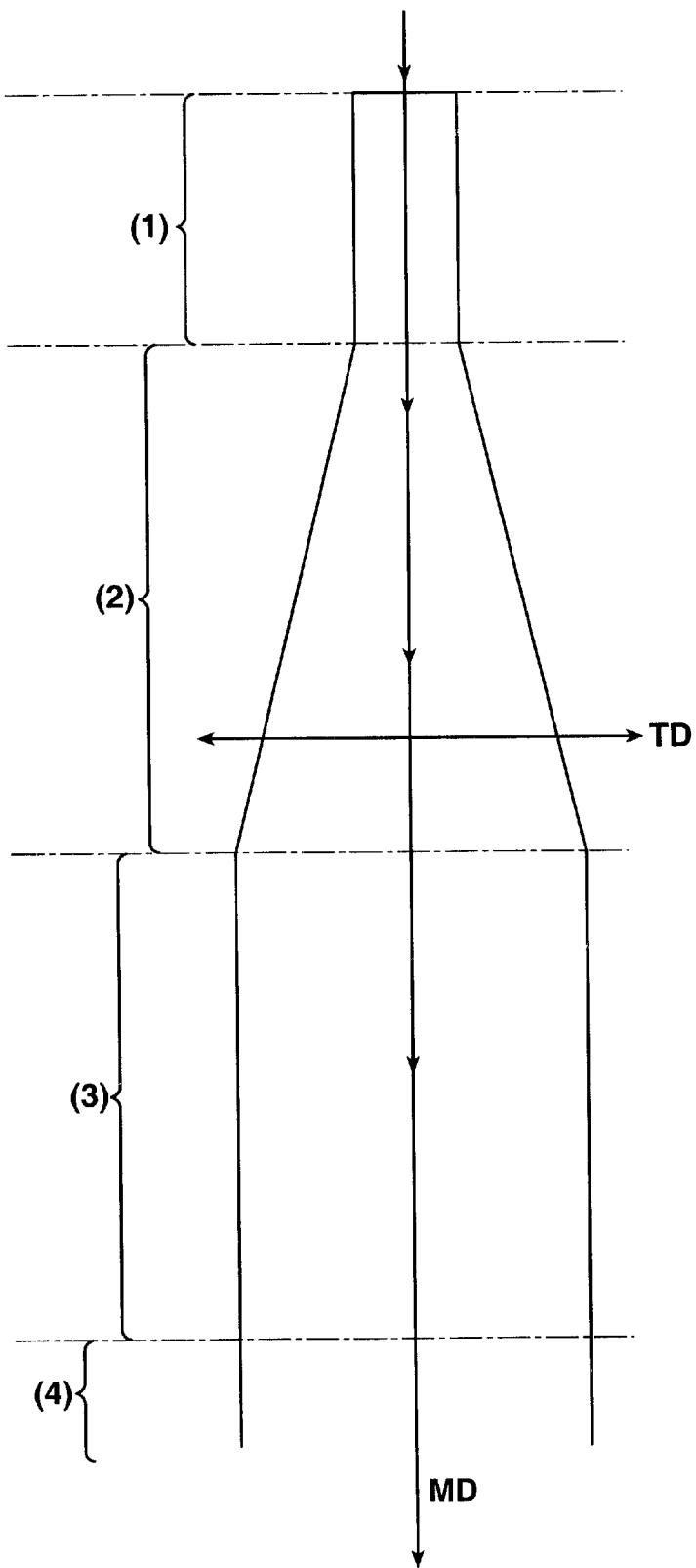
FIG. 1 is a schematic view of a film in connection with the inventive process.

In the film according to the present invention, the core layer (A) comprises one or more ethylene-vinyl alcohol co-polymers. Preferably, in order to guarantee optimum gas-barrier properties, said core layer will comprise at least 60%, preferably at least 70%, still more preferably at least 80%, and yet still more preferably at least 90% by weight of a single EVOH or a blend of two or more EVOHs. Examples of EVOH that may well be employed in the production of films according to the present invention are EVAL™ EC F151A or EVAL™ EC F101A, marketed by Marubeni.

The complement to 100% in said core layer (A) is typically made of one or more polyamides, such as those commonly indicated as nylon 6, nylon 66, nylon 6/66, nylon 12, nylon 6,12, and the like. In such a case a preferred polyamide is nylon 6/12, a copolymer of caprolactam with laurolactam, such as GRILON™ CF 6S or GRILON™ W8361 manufactured by EMS. Other plasticisers and/or other resins compatible with EVOH, as known in the art, can however be present in addition to or alternatively to the polyamide.

In a most preferred embodiment however the core layer (A) will essentially consist of EVOH.

Preferably, the core layer (A) has a thickness of from about 2 to about 15 $\mu$m, more preferably, from about 2.5 to about 10 $\mu$m, and, still more preferably, from about 2.8 to about 8 $\mu$m.

Preferably, the thickness of the core layer (A) is from about 5 to about 50 percent of the total thickness of the multi-layer film, more preferably, from about 8 to about 40%, still more preferably, from about 10 to about 30%.

Ethylene homo- and co-polymers that can suitably be employed for the first outer layer (B) and for the second outer layer (C) are independently selected from the group consisting of polyethylene homo-polymer, heterogeneous or homogeneous ethylene-α-olefin copolymer, ethylene-vinyl acetate co-polymer, ethylene-ethyl acrylate co-polymer, ethylene-butyl acrylate co-polymer, ethylene-methyl acrylate co-polymer, ethylene-acrylic acid co-polymer, and ethylene-methacrylic acid co-polymer, and blends thereof in any proportion.

Preferred ethylene homo- and co-polymers for the first outer layer (B) and for the second outer layer (C) are independently selected from the group consisting of polyethylene homo-polymers having a density of from about 0.900 g/cm$^3$ to about 0.950 g/cm$^3$, heterogeneous and homogeneous ethylene-α-olefin copolymers having a density of from about 0.890 g/cm$^3$ to about 0.945 g/cm$^3$, more preferably of from about 0.895 g/cm$^3$ to about 0.940 g/cm$^3$, yet more preferably of from about 0.900 g/cm$^3$ to about 0.935 g/cm$^3$, and ethylene-vinyl acetate copolymers comprising from about 3 to about 28% vinyl acetate comonomer, preferably, from about 4 to about 20% vinyl acetate comonomer, more preferably, from about 4.5 to about 18% vinyl acetate comonomer, and blends thereof.

Even more preferred ethylene homo- and co-polymers for the first outer layer (B) and for the second outer layer (C) are independently selected from the group consisting of heterogeneous and homogeneous ethylene-cc-olefin copolymers having a density of from about 0.900 g/cm$^3$ to about 0.935 g/cm$^3$, ethylene-vinyl acetate copolymers comprising from about 4.5 to about 18% vinyl acetate comonomer, and blends thereof.

Preferably, the ethylene homo- or co-polymers of the first outer layer (B) and of the second outer layer (C) independently have a melt index of from about 0.3 to about 10 g/10 min, more preferably from about 0.5 to about 8 g/10 min, still more preferably from about 0.8 to about 7 g/10 min, even more preferably from about 1 to about 6 g/10 min (as measured by ASTM D1238).

Additional polymers may be blended thereto in an amount that is up to about 30% by weight, preferably up to about 20% by weight, more preferably up to about 10% by weight, and still more preferably up to about 5% by weight. Preferred additional polymers include polybutene homo-polymers, propylene-ethylene co-polymers, propylene-ethylene-butene ter-polymers, propylene-butene-ethylene ter-polymers, butene-α-olefin copolymers, ionomers, and modified polyolefins.

In a preferred embodiment of the present invention the resin composition of the first outer layer (B) and that of the second outer layer (C), are the same. Still in said preferred embodiment these two outer layers may however differ in the presence and possibly in the amount of additives admixed with the resins.

In all the film layers, not only in the outer layers, the polymer components may in fact contain appropriate amounts of additives normally included in such compositions. These include slip and anti-block agents such as talc, waxes, silica, and the like, antioxidants, fillers, pigments and dyes, cross-linking inhibitors, cross-linking enhancers, UV absorbers, antistatic agents, anti-fog agents or compositions, and the like additives known to those skilled in the art of packaging films.

Preferably, each of the first outer layer (B) and the second outer layer (C) independently has a thickness of from about 2 to about 30 μm, more preferably, from about 3 to about 20 μm, and, still more preferably, from about 4 to about 15 μm.

Preferably, the thickness of each of the first outer layer (B) and the second outer layer (C) independently is from about 5 to about 50 percent of the total thickness of the multi-layer film, more preferably, from about 8 to about 40%, still more preferably, from about 10 to about 30%, and yet still more preferably, from about 15 to about 25%.

In a preferred embodiment of the present invention the first outer layer (B) and the second outer layer (C) both comprise a blend of different ethylene-α-olefin copolymers with a density of from about 0.900 g/cm$^3$ to about 0.935 g/cm$^3$ optionally blended with ethylene-vinyl acetate copolymer.

A tie layer is preferably present between the core layer (A) and each of the outer layers (B) and (C). These tie layers have the primary purpose of adhering two layers to one another, e.g. to improve the adhesion of the core layer (A) to the first outer layer (B), and/or the second outer layer (C). Preferred polymers for use in tie layers include, but are not restricted to, ethylene-vinyl acetate, ethylene-alkyl acrylate copolymer, anhydride-grafted polyolefin, and mixtures thereof. Most preferred polymers are anhydride grafted ethylene-vinyl acetate and anhydride grafted ethylene-α-olefin copolymers that may be blended with one or more polyolefins.

Additional inner layers can be present in the end structure to e.g. increase the bulk of the overall structure and/or further improve the shrink and/or the mechanical properties of the film, etc. as known in the art.

Suitable resins for said additional intermediate layers include for instance ethylene homo- or co-polymers, particularly ethylene-vinyl acetate copolymers, ethylene-alkyl acrylate or ethylene-alkyl methacrylate copolymers, ionomers, ethylene-α-olefin copolymers with a low density or very low density, polyamides, and the like resins.

In a preferred embodiment the film according to the present invention has five layers, with tie layers positioned between the core layer (A) and the outer layers (B) and (C).

In another preferred embodiment the film according to the present invention has seven layers with a polyamide layer directly adhered to each of the two opposite surfaces of the core layer (A), and tie layers between the polyamide layers and the outer layers (B) and (C).

In general, the layers of the film can consist of a single polymer, or can have still additional polymers together therewith, i.e., blended therewith.

The highly bi-axially oriented, heat-shrinkable, thermoplastic, multi-layer films of the resent invention can have any total thickness desired, so long as the film provides the desired properties for the particular packaging operation in which the film is used, e.g. optics modulus seal strength, etc. In a most preferred embodiment however the thickness of the film is lower than 35 μm; typically it is comprised between about 7 and about 30 μm; and even more preferably between about 8 and about 25 μm.

Also the number of layers is not critical but preferably the film will comprise up to a total of 9 layers, more preferably up to a total of 7 layers, and still more preferably, up to a total of 5 layers.

The film according to the present invention is obtained by melt extruding the polymers or polymer blends used for each layer through a flat die, cooling quickly the multi-layer sheet exiting from the extrusion die by means of a chill roll, optionally irradiating the cast sheet thus obtained to get cross-linking, reheating this flat tape to the suitably selected orientation temperature, simultaneously stretching the heated tape in both directions, MD and TD, at a stretching ratio higher than 4:1, preferably higher than 4.5:1, more preferably of at least 5:1 in both directions, by any simultaneous tenter apparatus, optionally stabilizing the obtained bi-axially oriented heat-shrinkable film by an annealing step, and finally cooling the highly oriented, heat shrinkable film thus obtained.

It has been found in fact that the simultaneous tenter frame orientation technique allows to apply stretching ratios higher than those applicable, under the same conditions, with the sequential tenter frame stretching technique and that the presence of a plasticizer in the core EVOH layer (A) is not strictly necessary as also tapes comprising a core layer (A) consisting essentially of EVOH can be easily stretched.

A second object of the present invention is therefore a process for manufacturing a highly bi-axially oriented, heat-shrinkable, thermoplastic, multi-layer film comprising a core layer (A) comprising an ethylene-vinyl alcohol copolymer (EVOH), a first outer layer (B) comprising an ethylene homo- or co-polymer and a second outer layer (C), which may be equal to or different from the first outer layer (B), comprising an ethylene homo- or co-polymer, which process comprises extrusion of the film resins through a flat die and bi-axial orientation of the obtained cast sheet simultaneously in the two perpendicular directions at an orientation ratio in the longitudinal direction higher than 4:1, preferably higher than 4.5:1, more preferably of at least 5:1 and at an orientation ratio in the cross-wise direction higher than 4:1, preferably higher than 4.5:1, more preferably of at least 5:1.

The process according to the present invention involves feeding the solid polymer beads for at least the core layer (A) and the first and second outer layers (B) and (C) to the extruders, where the polymer beads are melted and then forwarded into a flat extrusion die where the molten resins of the layers are combined to give the desired sequence. The obtained cast sheet, that is preferably from about 0.2 mm to about 3 mm thick, is then chilled on a chill roll, typically with the aid of an air knife that keeps the sheet in contact with the chill roll. Preferably the chill roll is partially immersed in a water bath at a low temperature (e.g. from about 5 to about 60° C.). Alternatively the cooling step can be carried out by using a liquid-knife as described in WO-A-95/26867 where a continuous and substantially uniform layer of water or of any other cooling liquid flows onto the surface of the sheet that does not contact the chill roll. Any other known means for cooling the cast web can however be employed.

The cooled sheet is then optionally fed through an irradiation unit, typically comprising an irradiation vault surrounded by a shielding, the flat sheet is irradiated with high energy electrons (i.e., ionizing radiation) from an iron core transformer accelerator. Irradiation is carried out to induce cross-linking. The flat sheet is preferably guided through the irradiation vault on rolls. It is thus possible by suitably combining the number of rolls and the path of the traveling web within the irradiation unit to get more than one exposure of the sheet to the ionizing radiation. Preferably, the sheet is irradiated to a level of from about 10 to about 200 kGy, more preferably of from about 15 to about 150 kGy, and still more preferably of from about 20 to about 120 kGy, wherein the most preferred amount of radiation is dependent upon the polymers employed and the film end use. While irradiation is preferably carried out on the extruded cast sheet just before orientation, as described above, it could also be carried out, alternatively or additionally, during or after orientation.

The optionally irradiated cast sheet is then fed to the pre-heating zone of the simultaneous tenter apparatus, with or without a prior passage through an IR heated oven. With reference to FIG. 1, the pre-heating zone is indicated as (1). The temperature of the oven in said pre-heating zone, the length thereof and the time spent by the traveling web in said zone (i.e. the web speed) can suitably be varied in order to bring the sheet up to the desired temperature for bi-axial orientation. In a preferred embodiment the orientation temperature is comprised between about 100° C. and about 140° C. and the temperature of the pre-heating zone is kept between about 110° C. and about 150° C. In said pre-heating zone the sheet is clipped but it is not yet stretched. Thereafter, the resulting hot, optionally irradiated, and clipped sheet is directed to the stretching zone of the simultaneous tenter, indicated in FIG. 1 as (2). Any stretching means can be used in said zone, provided a simultaneous stretching of the sheet in the machine and the transverse direction is obtained. Preferably however the clips are propelled throughout the opposed loops of the tenter frame by means of a linear synchronous motor. A suitable line for simultaneous stretching with linear motor technology has been designed by Brueckner GmbH and advertised as LISIM® line. The configuration of the tenter can be varied depending on the stretching ratios desired. Using a synchronous linear motor tenter, the stretching ratios that can be applied are generally comprised between about 3:1 and about 10:1 for MD stretching and between about 3:1 and about 10:1 for TD stretching. Preferably however stretching ratios higher than 4:1 in both directions are applied, wherein stretching ratios higher than 4.5:1 are more preferred and stretching ratios of at least 5:1 are even more preferred. The temperature in the stretching zone is kept close to the selected orientation temperature. The stretched film is then transferred in a relaxation or annealing zone, indicated in FIG. 1 as (3) heated to a temperature of about 70–90° C. Following the annealing step the film is transferred to a cooling zone, indicated in FIG. 1 as zone (4), where generally air, either cooled or kept at the ambient temperature, is employed to cool down the film. The temperature of said cooling zone is therefore typically comprised between about 20 and about 40° C. At the end of the line, the edges of the film, that were grasped by the clips and have not been oriented, are trimmed off and the obtained bi-axially oriented, heat-shrinkable film is then wound up, with or without prior slitting of the film web to the suitable width.

The bi-axially oriented, heat-shrinkable film comprising at least a core layer (A) comprising an ethylene-vinyl alcohol copolymer, a first outer layer (B) comprising an ethylene homo- or co-polymer, and a second outer layer (C), which may be equal to or different from (B), comprising an ethylene homo- or co-polymer, obtained by the above process, has a total free shrink, at 120° C., of from about 30 to about 170 percent, preferably from about 40 to about 160 percent, more preferably from about 50 to about 150 percent, still more preferably from about 60 to about 140 percent, and still more preferably from about 70 to about 130 percent. The free shrink properties of the thus obtained film are fairly balanced in the two directions and differences of less than 15, preferably less than 10, and even more preferably less than 5, between the % free shrink in MD and the % free shrink in TD are obtained.

The film thus obtained also exhibits a shrink tension in either direction of at least 40 psi, and preferably of at least 50 psi. Shrink tension is measured in accordance with ASTM D 2838.

The film thus obtained has a thickness variation of less than 10 percent, preferably less than 8 percent, and more preferably less than 5 percent.

The obtained film may then be subjected to a corona discharge treatment to improve the print receptivity characteristics of the film surface. As used herein, the phrases "corona treatment" and "corona discharge treatment" refer to subjecting the outer surfaces of the film to a corona discharge treatment, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in e.g. U.S. Pat. No. 4,120,716.

The invention is further illustrated by the following examples, which are provided for the purpose of representation, and are not to be construed as limiting the scope of the invention. Unless stated otherwise, all percentages, parts, etc. are by weight.

EXAMPLE 1

A five-layer, heat-shrinkable film with the following layer arrangement (C)/(D)/(A)/(D)/(B) and a thickness ratio of 2/2/1/2/2 is produced by the general process described above. In particular, the temperature of the chill roll is kept at 15–25° C. and the extruded sheet is pinned to the chill roll by means of an air knife. The thickness of the cast extruded sheet before orientation is about 0.5 mm and the linear speed of the quenched sheet is about 8 m/min. The sheet is irradiated before orientation to 45 kGray by means of a scan beam unit operated at 500 kVolt. The sheet is passed twice under the irradiation window to provide for a uniform cross-linking. The temperature in the pre-heating zone is kept between about 120 and about 130° C. The stretching ratios applied are 4.5:1 in MD and 4.5:1 in TD and the temperature in the stretching zone is maintained between about 120 and about 130° C. The annealing step is carried out at about 80–85° C. and the cooling step at about 30–35° C. After cooling, the film edges are trimmed off and the film is wound onto a roll at a speed of about 36 m/min.

The resins employed for the various layers were as follows:

(A) 90% by weight of ethylene-vinyl alcohol copolymer containing 44% of ethylene (EVAL™ EC F151A from Marubeni) and 10% of a nylon 6,12 (GRILON™ CF 6S from EMS);

(B) 50.1% of a heterogeneous ethylene-octene copolymer with a density of 0.920 g/cm$^3$ and a melt index of 1.0 g/10 min (Dowlex™ 2045 by Dow);

24.8% of a heterogeneous ethylene-octene copolymer with a density of 0.935 g/cm$^3$ and a melt index of 2.6 g/10 min (Dowlex™ SC 2101 by Dow);

24.6% of ethylene-vinyl acetate copolymer (4.5% of vinyl acetate content) with a density of 0.926 g/cm$^3$ and a melt index of 2.0 g/10 min (Escorene™ LD 362 BW by Exxon); and 0.5% of slip and anti-block agents;

(C) as (B) above;

(D) maleic anhydride grafted heterogeneous ethylene-butene copolymer with d=0.920 g/cm$^3$ and MFI=1.2 g/10' (Bynel™ 4104 by DuPont).

The thus obtained film has a thickness of 25 μm.

The thickness variation is less than 10%, and the free shrink is higher than 120.

EXAMPLE 2

A five-layer, heat-shrinkable film with the same layer arrangement as in Example 1 but with a thickness ratio of 3/2/2/2/3 is produced by the same process described in Example 1 with the only difference that the stretching ratio in the cross-wise direction is 5:1.

The thus obtained film has a thickness of 22 μm.

The thickness variation is less than 10%, and the free shrink is higher than 120%.

EXAMPLE 3

A five-layer, heat-shrinkable film with the same layer arrangement and thickness ratio as in Example 1 is produced by the same process there described. The composition of the film layers is the same as in Example 1 with the only difference that the outer layers (B) and (C) also comprise 2% by weight of the overall weight of the layers of an anti-fog composition comprising glycerol mono-oleate and poly-ethoxylated fatty alcohols.

EXAMPLE 4

The process of Example 1 is repeated with the only difference that the irradiation step is avoided.

EXAMPLE 5

A five-layer, heat-shrinkable film with the same layer arrangement and thickness ratio as in Example 1 is produced by the same process there described. The resins employed for the various layers were as follows:

(A) 100% by weight of ethylene-vinyl alcohol copolymer containing 44% of ethylene EVAL™ EC F151A from Marubeni);

(B) 46.6% of a heterogeneous ethylene-α-olefin copolymer with d=0.920 g/cm$^3$ and MFI=1.0 g/10' (Dowlex™ 2045E by Dow);

25% of a heterogeneous ethylene-α-olefin copolymer with d=0.935 g/cm$^3$ and MFI=2.6 g/10' (Dowlex™ SC2102 by Dow);

25% of a heterogeneous ethylene-α-olefin copolymer with d=0.902 g/cm$^3$ and MFI=3.0 g/10' (Teamex™ 1000F by DSM); 3% of an anti-fog composition; and about 0.4% of silica;

(C) as (B) above (D) homogeneous ethylene-α-olefin copolymer (Tafmer™ like) with d=0.906 g/cm$^3$ and MFI=1.5 g/10', modified with maleic anhydride (m.p. 120° C.) (ADMER™ AT1094E by Mitsui).

The thus obtained film has a thickness of 25 μm.

The thickness variation is less than 10%, and the free shrink is higher than 120.

EXAMPLE 6

A five-layer, heat-shrinkable film with the same layer arrangement and thickness ratio as in Example 5 is produced by the same process there described. The resins employed for the various layers are as in Example 5 with the only difference that the heterogeneous ethylene-α-olefin copolymer with d=0.902 g/cm$^3$ and MFI=3.0 g/10' (Teamex™ 1000F by DSM) in layers (B) and (C) is replaced with a homogeneous ethylene-α-olefin copolymer with d=0.902 g/cm$^3$ and MFI=1.0 g/10' (Affinity™ PL1880 by Dow).

EXAMPLE 7

A five-layer, heat-shrinkable film with the same layer arrangement and thickness ratio as in Example 5 is produced by the same process there described. The resins employed for the various layers are as in Example 5 with the only difference that the heterogeneous ethylene-α-olefin copolymer with d=0.902 g/cm$^3$ and MFI=3.0 g/10' (Teamex™ 1000F by DSM) in layers (B) and (C) is replaced with a homogeneous ethylene-α-olefin ter-polymer with d=0.900 g/cm$^3$ and MFI=1.2 g/10' (Exact™ 3033 by Exxon).

EXAMPLE 8

A five-layer, heat-shrinkable film with the same layer arrangement and thickness ratio as in Example 5 is produced by the same process there described. The resins employed for the various layers are as in Example 5 with the only difference that the heterogeneous ethylene-α-olefin copolymer with d=0.902 g/cm$^3$ and MFI=3.0g/10' (Teamex™ 1000F by DSM) in layers (B) and (C) is replaced with a homogeneous ethylene-α-olefin ter-polymer with d=0.902 g/cm$^3$ and MFI=2.0 g/10' (Exact™ 9042 by Exxon).

EXAMPLE 9

A five-layer, heat-shrinkable film with the same layer arrangement and thickness ratio as in Example 5 is produced by the same process there described. The resins employed for the various layers are as in Example 5 with the only difference that the heterogeneous ethylene-α-olefin copolymer with d=0.902 g/cm$^3$ and MFI=3.0 g/10' (Teamex™ 1000F by DSM) in layers (B) and (C) is replaced with a heterogeneous ethylene-α-olefin co-polymer with d=0.912 g/cm$^3$ and MFI=3.2 g/10' (Attane™ 4202 by Dow).

EXAMPLE 10

A seven-layer, heat-shrinkable film with the following layer arrangement (C)/(D)/(E)/(A)/(E)/(D)/(B) and a thickness ratio of 3/2/1/2/1/2/3 is produced by the general process described in Example I using however stretching ratios of 5:1 in both directions.

The resins employed for the various layers were as follows:

(A) 90% by weight of ethylene-vinyl alcohol copolymer containing 44% of ethylene (EVAL™ EC F151A from Marubeni) and 10% of a nylon 6,12 (GRILON™ CF 6S from EMS);

(B) 50.1% of a heterogeneous ethylene-octene copolymer with a density of 0.920 g/cm$^3$ and a melt index of 1.0 g/10 min (Dowlex™ 2045 by Dow); 24.8% of a heterogeneous ethylene-octene copolymer with a density of 0.935 g/cm$^3$ and a melt index of 2.6 g/10 min (Dowlex™ SC 2101 by Dow);

24.6% of ethylene-vinyl acetate copolymer (4.5% of vinyl acetate content) with a density of 0.926 g/cm$^3$ and a melt index of 2.0 g/10 min (Escorene™ LD 362 BW by Exxon); and 0.5% of slip and anti-block agents;

(C) As (B) above;

(D) homogeneous ethylene-α-olefin copolymer (Tafmer™ like) with d=0.906 g/cm³ and MFI=1.5 g/10', modified with maleic anhydride (m.p. 129° C.) (ADMER™ AT1094E by Mitsui);

(E) nylon 6,12 (GRILON™ CF 6S from EMS).

The thus obtained film has a thickness of 25 μm.

The thickness variation is less than 10%, and the free shrink is higher than 120.

EXAMPLE 11

A five-layer, heat-shrinkable film with the following layer arrangement (C)/(D)/(A)/(D)/(B) and a thickness ratio of 3/1/1/1/3 is produced by the general process described in Example 1 with the only differences that a maleic anhydride grafted homogeneous ethylene-α-olefin copolymer (ADMER™ AT1094E by Mitsui) is employed instead of the maleic anhydride grafted heterogeneous ethylene-butene copolymer (Bynel™ 4104 by DuPont) in the tie layers (D), and that the extruded sheet is irradiated before orientation to 65 kGray.

The thus obtained film has a thickness of 25 μm.

The thickness variation is less than 10%, and the free shrink is higher than 120. The films obtained according to the present invention can be used in the packaging of food and not food products as known in the art. To this purpose they can be used in the flat form to be wrapped up around the product to be packaged or they may be first converted into bags or pouches by conventional techniques well known to the person skilled in the art. They can also be coupled or laminated to other films or sheets to obtain a packaging material of improved performance.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A process for manufacturing a highly bi-axially oriented, heat-shrinkable, thermoplastic, multi-layer film comprising a core layer (A) comprising an ethylene-vinyl alcohol copolymer (EVOH), a first outer layer (B) comprising an ethylene homo- or co-polymer, and a second outer layer (C), which may be equal to or different from the first outer layer (B), comprising an ethylene homo- or co-polymer, which process comprises extrusion of the film resins through a flat die and bi-axial orientation of the obtained cast sheet simultaneously in two perpendicular directions at an orientation ratio in the longitudinal direction higher than 4:1, and at an orientation ratio in the cross-wise direction higher than 4:1.

2. The process of claim 1 wherein the stretching is carried out at a temperature of from about 100° C. to about 140° C. and the sheet is pre-heated at a temperature of from about 110° C. to about 150° C.

3. The process of claim 2 wherein the bi-axially oriented film is submitted to a relaxation step at a temperature of from about 70° C. to about 90° C.

4. The process of claim 1 wherein the ethylene homo- and co-polymers for the first outer layer (B) and for the second outer layer (C) are independently selected from the group consisting of polyethylene homo-polymer, heterogeneous or homogeneous ethylene-alpha-olefin copolymer, ethylene-vinyl acetate co-polymer, ethylene-ethyl acrylate co-polymer, ethylene-butyl acrylate co-polymer, ethylene-methyl acrylate co-polymer, ethylene-acrylic acid co-polymer, ethylene-methacrylic acid co-polymer, and blends thereof in any proportion.

5. The process of claim 4 wherein the ethylene homo- and co-polymers for the first outer layer (B) and for the second outer layer (C) are independently selected from the group consisting of polyethylene homo-polymers having a density of from about 0.900 g/cm³ to about 0.950 g/cm³, heterogeneous and homogeneous ethylene-alpha-olefin co-polymers having a density of from about 0.890 g/cm³ to about 0.945 g/cm³, and ethylene-vinyl acetate copolymers comprising from about 3 to about 28% by weight vinyl acetate comonomer.

6. The process of claim 5 wherein the ethylene homo- and co-polymers for the first outer layer (B) and for the second outer layer (C) are independently selected from the group consisting of heterogeneous and homogeneous ethylene-alpha-olefin copolymers having a density of from about 0.900 g/cm³ to about 0.935 g/cm³, and ethylene-vinyl acetate co-polymers comprising from about 4.5 to about 18% by weight vinyl acetate comonomer.

7. The process of claim 1 wherein the core layer (A) consists essentially of one or more ethylene-vinyl alcohol co-polymers.

8. The process of claim 1 wherein the multi-layer film is irradiatively cross-linked.

9. The process of claim 1 wherein the multi-layer film comprises at least five layers wherein a tie layer is positioned between the core layer (A) and each one of the outer layers (B) and (C).

10. The process of claim 1 wherein the obtained cast sheet is biaxially oriented simultaneously in two perpendicular directions at an orientation ratio in the longitudinal direction higher than 4.5:1, and at an orientation ratio in the cross-wise direction higher than 4.5:1.

11. The process of claim 1 wherein the obtained cast sheet is biaxially oriented simultaneously in two perpendicular directions at an orientation ratio in the longitudinal direction of at least 5:1, and at an orientation ratio in the cross-wise direction of at least 5:1.

* * * * *